(12) United States Patent
Kapp et al.

(10) Patent No.: US 10,808,589 B2
(45) Date of Patent: Oct. 20, 2020

(54) EXHAUST TREATMENT SYSTEM AND METHOD FOR TREATING ENGINE EXHAUST

(71) Applicants: Hyundai Motor Company, Seoul (KR); Kia Motors Corporation, Seoul (KR)

(72) Inventors: Andreas Kapp, Eschborn (DE); Stefan Lang, Graevenwiesbach (DE); Peter Gozner, Mannheim (DE); Ulrich Karrer, Mainz (DE); Roman Pelzetter, Reichelsheim (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 144 days.

(21) Appl. No.: 16/025,601

(22) Filed: Jul. 2, 2018

(65) Prior Publication Data
US 2019/0331014 A1    Oct. 31, 2019

(30) Foreign Application Priority Data
Apr. 26, 2018    (DE) .......................... 10 2018 206 442

(51) Int. Cl.
*F01N 3/20*    (2006.01)
*B01D 53/94*    (2006.01)
*F01N 13/00*    (2010.01)

(52) U.S. Cl.
CPC .......... *F01N 3/208* (2013.01); *B01D 53/9418* (2013.01); *B01D 53/9495* (2013.01);
(Continued)

(58) Field of Classification Search
CPC .............. F01N 3/2066; F01N 2240/02; F01N 2240/10; F01N 5/02; F01N 2240/18;
(Continued)

(56) References Cited

U.S. PATENT DOCUMENTS 9,694,320 B2    7/2017 Reith et al.
2009/0272099 A1*    11/2009 Garimella ............... F01N 3/208
                                                                60/277
(Continued)

FOREIGN PATENT DOCUMENTS

DE    10 2008 045 959 B4    5/2013
EP    0 471 186 A1    2/1992
EP    0 663 063 B1    1/1997

*Primary Examiner* — Anthony Ayala Delgado
(74) *Attorney, Agent, or Firm* — Mintz Levin Cohn Ferris Glovsky and Popeo, P.C.; Peter F. Corless

(57) ABSTRACT

A system and method for treating an engine exhaust is provided. In particular, waste heat from an engine exhaust is stored in a latent heat storage structure through a controllable heat exchanger and a selective catalytic reduction (SCR) catalytic converter is heated by the stored thermal energy in the latent heat storage structure using the controllable heat exchanger. The exhaust treatment system includes a selective catalytic reduction catalytic converter that has an inlet for connecting to an internal combustion engine to intake an engine exhaust and an outlet to output a catalytically treated engine exhaust. The system further includes a latent heat storage structure and a controllable heat exchanger for selectively exchanging heat to and from the catalytic converter and the latent heat storage structure.

10 Claims, 5 Drawing Sheets

(52) U.S. Cl.
CPC ......... *F01N 3/2006* (2013.01); *F01N 13/008* (2013.01); *F01N 2560/06* (2013.01); *F01N 2900/1404* (2013.01); *F01N 2900/1602* (2013.01)

(58) Field of Classification Search
CPC ........ F01N 2260/08; F01N 3/26; Y02T 10/16; F28D 15/00; F28D 20/00; Y02E 60/142
See application file for complete search history.

(56) References Cited

U.S. PATENT DOCUMENTS

2017/0210196 A1\* 7/2017 Bidner ............... B60H 1/00885
2019/0040782 A1\* 2/2019 Zenner .................. F01N 3/2006

\* cited by examiner

EXHAUST TREATMENT SYSTEM AND METHOD FOR TREATING ENGINE EXHAUST

CROSS-REFERENCE TO RELATED APPLICATION

This application claims priority to and the benefit of German Patent Application No. 102018206442.3 filed in the German Patent and Trademark Office on Apr. 26, 2018, the entire contents of which are incorporated herein by reference.

TECHNICAL FIELD

The present invention relates to a system and method for treating engine exhaust, and more particularly, to a system and method for heating a selective catalytic reduction (SCR) catalytic converter.

BACKGROUND

For treatment of exhaust gases from internal combustion engines of vehicles, a selective catalytic reduction (SCR) catalytic converter has been developed to reduce toxic NOx to nitrogen. To reduce NOx effectively there is a minimum temperature requirement for a SCR catalytic converter. For example, the SCR reaction will begin at about 180-250° C. according to the related art. Therefore, there has been a demand for a system and method for heating an SCR catalytic converter to reach a sufficient temperature of the SCR reaction rapidly, especially, during cold engine starts or during engine warm-up periods.

The related art discloses a latent heat storage material. The latent heat storage material uses the enthalpy of reversible thermodynamic phase changes. In particular, the phase transition exploited can be solid-liquid. During melting, the latent heat storage material absorbs a given amount of heat. This process is reversible, and thus, the latent heat storage material may release the stored amount of heat during solidification again. Additionally, an exhaust treatment system of an internal combustion engine has been developed that includes an SCR catalytic converter to reduce the nitrogen oxides contained in the exhaust to nitrogen, using reductant additives from a reductant additive supply system. The supply system is arranged within the heat insulating arrangement with a latent heat storage material to prevent the reductant additives from freezing.

The related art also provides an exhaust gas purification device for a diesel engine, in which a soot particle filter, a further unit for exhaust gas treatment, in particular a catalyst for NOx removal, is connected downstream and a heater for burning off deposits of the particulate filter is provided. A buffer body is connected to a NOx catalyst through manifold. The buffer body may be made of metal or a latent heat storage material to absorb part of the heat developed during the burning operation and this later releases back to the exhaust gas.

As described above, a latent heat storage material has been used to maintain temperature of reductant additives or buffer body constant in a passive manner.

SUMMARY

It is an object of the invention to achieve an improved SCR efficiency, in particular during cold engine starts or during engine warm-up periods. The present invention provides a combination of a latent heat storage structure and a controllable heat exchanger. This combination allows for control of heating an SCR catalytic converter by utilizing waste heat from an engine exhaust stored in the latent heat storage structure.

According to an exemplary embodiment, the controllable heat exchanger further comprises a heat transfer fluid, and a fluid conducting network for conducting the heat transfer fluid to and from the controllable heat exchanger and the latent heat storage structure. Thus, the heat transfer fluid may transfer heat effectively to and from the controllable heat exchanger and the latent heat storage structure through the fluid conducting network. Accordingly, the latent heat storage structure may be spaced apart from the SCR catalytic converter thus increasing freedom of design.

According to an exemplary embodiment, the controllable heat exchanger may include a heating jacket or a heating element that surrounds the catalytic converter at least partially and/or located at least partially within the catalytic converter. In other words, the controllable heat exchanger may be a heating jacket or a heating element that surrounds the catalytic converter at least partially. This may be advantageous since no additional heat exchanger may be required.

Additionally, the exhaust treatment system may further include a pump configured to circulate the heat transfer fluid within the fluid conducting network, at least one valve in the fluid conducting network between the controllable heat exchanger and the latent heat storage structure, at least one temperature sensor configured to measure a temperature of the engine exhaust, and/or of the catalytically treated engine exhaust, and/or of the latent heat storage structure, and/or of the heat transfer fluid, and a controller configured to operate the pump and the valve based on a measurement of the at least one temperature sensor to thus operate the controllable heat exchanger. Therefore, the operation of the heat transfer fluid may be controlled by the pump and the valve based on a measurement of at least one temperature sensor.

The exhaust treatment system may further include a selective catalytic reduction doser configured to add an additive to the engine exhaust between the inlet and the catalytic converter. Thus, the selective catalytic doser may be configured to receive heat from the catalytic converter and accordingly, the reductant additives may be prevented from freezing. A first temperature sensor may be configured to measure a temperature of the catalytically treated engine exhaust. The controller may then be configured to compare the temperature of the catalytically treated engine exhaust with a first predetermined value. When the temperature of the catalytically treated engine exhaust is less than the first predetermined value, the controller may be configured to open at least one valves and start the pump. Therefore, the temperature increase of the selective catalytic reduction catalytic converter may be controlled.

Further, the exhaust treatment system may include a second temperature sensor configured to measure a temperature of the suctioned engine exhaust, and a third temperature sensor configured to measure a temperature of an outlet fluid. The controller may be configured to compare the temperature of the suctioned engine exhaust, with the temperature of the outlet fluid. When the temperature of the suctioned engine exhaust exceeds the temperature of the outlet fluid, the controller may be configured to close at least one valve and stop the pump to thus stop the temperature increase of the selective catalytic reduction catalytic converter.

A fourth temperature sensor may be configured to measure a temperature of the latent heat structure. The controller may be configured to compare the temperature of the suctioned engine exhaust with a second predetermined value and compare the temperature of the latent heat structure with the second predetermined value. When the temperature of the engine exhaust exceeds the temperature of the second predetermined value and the second predetermined value exceeds the temperature of the latent heat structure, the controller may be configured to open at least one valve and start the pump to thus adjust to load the latent heat storage structure.

Additionally, a fifth temperature sensor may be configured to measure a temperature of an inlet fluid. The controller may then be configured to compare the temperature of the outlet fluid with the temperature of the inlet fluid. When the temperature of the outlet fluid exceeds the temperature of the inlet fluid, the controller may be configured to close at least one valve and stop the pump to thus stop loading the latent heat storage structure. The latent heat storage structure may include a phase change material configured to store or release thermal energy when the phase change material is transitioning from one phase to another. Accordingly, waste heat may be stored in a temperature range determined by the phase change material used.

According to an exemplary embodiment, a section of the fluid conducting network passes from an inlet of the latent heat storage structure to an outlet of the latent heat storage structure through the latent heat storage structure. Thus, heat transfer fluid may efficiently transfer thermal energy to and from the controllable heat exchanger and the latent heat storage structure.

According to another exemplary embodiment, a method of treating an engine exhaust may include providing a selective catalytic reduction catalytic converter, providing a latent heat storage structure, providing a controllable heat exchanger, guiding an engine exhaust into the catalytic converter, operating the controllable heat exchanger for selectively exchanging heat to and from the catalytic converter and the latent heat storage structure, and outputting a catalytically treated engine exhaust from the catalytic converter. This method allows for a controller temperature increase of an SCR catalytic converter by utilizing waste heat from an engine exhaust stored in the latent heat storage structure in an exhaust treatment system.

The method may further include providing a heat transfer fluid and providing a fluid conducting network for conducting the heat transfer fluid to and from the controllable heat exchanger and the latent heat storage structure. This method allows the heat transfer fluid to transfer heat effectively to and from the controllable heat exchanger and the latent heat storage structure through the fluid conducting network, and allows for positioning the latent heat storage structure apart from the SCR catalytic converter, thus increasing freedom of design.

Additionally, the method may include providing a pump configured to circulate the heat transfer fluid within the fluid conducting network, providing at least one valve in the fluid conducting network between the controllable heat exchanger and the latent heat storage structure, providing a temperature of the catalytically treated engine exhaust, comparing the temperature of the catalytically treated engine exhaust with a first predetermined value, opening at least one valve and starting the pump when the temperature of the catalytically treated engine exhaust is less than the first predetermined value, providing a temperature of the engine exhaust, providing a temperature of an outlet fluid, comparing the temperature of the engine exhaust being guided to the catalytic converter with the temperature of the outlet fluid, closing at least one valve and stopping the pump when the temperature of the suctioned engine exhaust exceeds the temperature of outlet fluid.

In particular, the providing of the temperature of the catalytically treated engine exhaust, the engine exhaust, and/or the outlet fluid may include providing a temperature sensor configured to measure a temperature of the catalytically treated engine exhaust, the engine exhaust, and/or the outlet fluid, respectively. Alternatively, a temperature model may be evaluated to determine the temperature of the catalytically treated engine exhaust, the engine exhaust, and/or the outlet fluid, respectively.

According to another exemplary embodiment, the method of treating an engine exhaust may further include providing a pump configured to circulate the heat transfer fluid within the fluid conducting network, providing at least one valve in the fluid conducting network between the controllable heat exchanger and the latent heat storage structure, providing a temperature of the suctioned engine exhaust, providing a temperature of the latent heat structure, comparing the temperature of the suctioned engine exhaust with a second predetermined value and comparing the temperature of the latent heat structure with the second predetermined value, opening at least one valve and starting the pump when the temperature of the engine exhaust exceeds the temperature of the second predetermined value and the second predetermined value exceeds the temperature of the latent heat structure, comparing the temperature of the outlet fluid with the temperature of the inlet fluid, and closing at least one valve and stopping the pump when the temperature of the outlet fluid exceeds the temperature of the inlet fluid.

In particular, the providing of the temperature of the suctioned engine exhaust and/or the latent heat structure may include providing a temperature sensor configured to measure a temperature of the suctioned engine exhaust and/or the latent heat structure, respectively. Alternatively, a temperature model may be evaluated to determine the temperature of the suctioned engine exhaust and/or of the latent heat structure, respectively.

BRIEF DESCRIPTION OF DRAWINGS

The invention will be explained in greater detail with reference to exemplary embodiments depicted in the drawings as appended.

DETAILED DESCRIPTION

Figure 1:
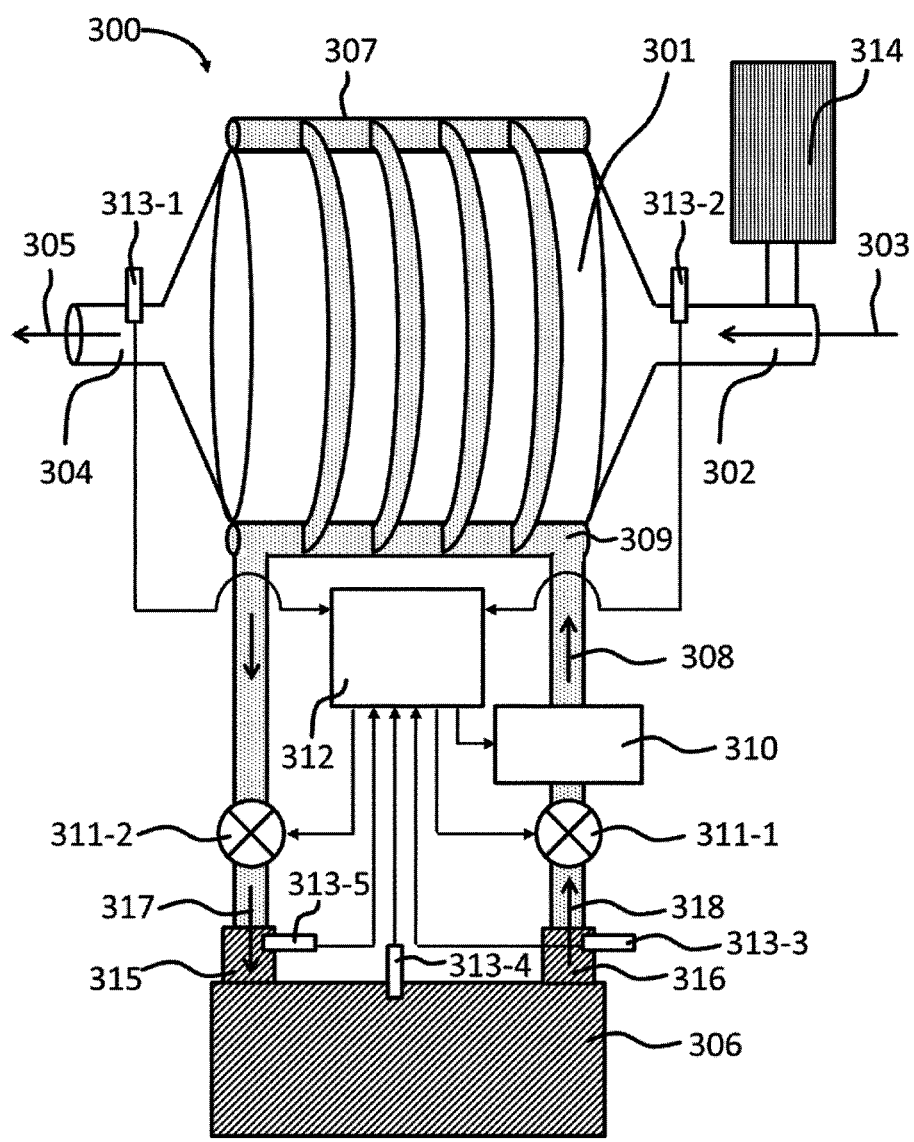
FIG. 1 is a schematic drawing of an exhaust treatment system in accordance with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiments have been illustrated and described herein, it will be appreciated by those of ordinary skill in the art that a variety of alternate and/or equivalent implementations may be substituted for the specific exemplary embodiments shown and described without departing from the scope of the present invention. Generally, this application is intended to cover any adaptations or variations of the specific exemplary embodiments discussed herein.

Hereinafter, exemplary embodiments of the present invention will be described with reference to the drawings. As illustrated in FIG. 1, the main part of the exhaust treatment system 300 may include a selective catalytic reduction catalytic converter 301 having an inlet 302 for connecting to an internal combustion engine to intake an engine exhaust 303 and an outlet 304 to output a catalytically treated engine exhaust 305, a latent heat storage structure 306, and a controllable heat exchanger 307 for selectively exchanging heat to and from the catalytic converter 301, and the latent heat storage structure 306.

In particular, the latent heat storage structure 306 may be a phase change material configured to store or release thermal energy when the phase change material is transitioning from one phase to another. The controllable heat exchanger 307 may include a heat transfer fluid 308 and a fluid conducting network 309 for conducting the heat transfer fluid 308 to and from the controllable heat exchanger 307 and the latent heat storage structure 306. The heat transfer fluid may be a heat transfer oil or the like.

A section of the fluid conducting network 309 may pass from an inlet of the latent heat storage structure 315 to an outlet of the latent heat storage structure 316 through the latent heat storage structure 306. The controllable heat exchanger 307 may be a heating jacket or a heating element that surrounds the catalytic converter 301 at least partially and/or located at least partially within the catalytic converter 301. Accordingly, an additional heat exchanger may be omitted.

The system 300 may further include a pump 310 configured to circulate the heat transfer fluid 308 within the fluid conducting network 309. Advantageously, at least one valve in the fluid conducting network 309 may be disposed between the controllable heat exchanger 307 and the latent heat storage structure 306, for example, a first valve 311-1 may be positioned between the pump 310 and an outlet of the latent heat storage structure 316 and a second valve 311-2 may be positioned between the pump 310 and an inlet of the latent heat storage structure 315. The valves 311-1, 311-2 may be collectively designated as 311-$i$.

The system 300 may also include at least one temperature sensor 313-2 configured to measure a temperature T303 of at least one of the engine exhaust 303, the catalytically treated engine exhaust 305, the latent heat storage structure 306, and the heat transfer fluid 308, and a controller 312 may be configured to operate the pump 310 and the valve 311-$i$ based on a measurement of the at least one temperature sensor 313-$i$ to thus operate the controllable heat exchanger 307. The valve 311-$i$ may be closed valve in a normal state to maintain a closed state when the engine is stopped for parking of the vehicle. During the parking, the pump is also stopped. Therefore, during the parking, the latent heat storage structure may maintain the temperature. The system 300 may further optionally include a selective catalytic reduction doser 314 configured to add an additive to the engine exhaust 303 between the inlet 302 and the catalytic converter 301. The additive may be NOx-reducing agent, for example, urea, ammonia ($NH_3$), hydrocarbon (HC) or the like.

The system 300 may further include a first temperature sensor 313-1 configured to measure a temperature T305 of the catalytically treated engine exhaust 305. The controller 312 may then be configured to compare the temperature T305 of the catalytically treated engine exhaust 305 with a first predetermined value T1. When the temperature T305 of the catalytically treated engine exhaust 305 is less than the first predetermined value T1, the controller 312 may be configured to open at least one valve 311-$i$ and start the pump 310. The first predetermined value T1 may be a desired temperature of the catalytically treated engine exhaust.

A second temperature sensor 313-2 may be configured to measure a temperature T303 of the suctioned engine exhaust 303, and a third temperature sensor 313-3 may be configured to measure a temperature T318 of an outlet fluid 318. The controller 312 may be configured to compare the temperature T303 of the suctioned engine exhaust 303 with the temperature T318 of the outlet fluid 318. When the temperature T303 of the suctioned engine exhaust 303 exceeds the temperature T318 of the outlet fluid 318, the controller 312 may be configured to close at least one valve 311-i and stop the pump 310.

Additionally, a fourth temperature sensor 313-4 may be configured to measure a temperature T306 of the latent heat structure 306. The controller 312 may be configured to compare the temperature T303 of the suctioned engine exhaust 303 with a second predetermined value T2 and compare the temperature T306 of the latent heat storage structure 306 with the second predetermined value. When the temperature T303 of the engine exhaust 303 exceeds the temperature T2 of the second predetermined value T2 and the second predetermined value T2 exceeds the temperature T306 of the latent heat structure 306, the controller 312 may be configured to open at least one valve 311-i and start the pump 310. The second predetermined value T2 may be desired temperature of the latent heat storage structure 306. The second predetermined value T2 may be the phase change temperature of the latent heat storage structure 306.

A fifth temperature sensor 313-5 may be configured to measure a temperature T317 of an inlet fluid 317 and the controller 312 may be configured to compare the temperature T318 of the outlet fluid 318 with the temperature T317 of the inlet fluid 317. When the temperature T318 of the outlet fluid 318 exceeds the temperature T317 of the inlet fluid 317, the controller 312 may be configured to close at least one valve 311-i and stop the pump 310.

Alternately, the controller 312 may include or be configured to access a temperature model stored in a memory. One or more of the temperatures T303, T305, T306, T317, T318 may instead of, or in addition to, being measured by the corresponding temperature sensor 313-1, 313-2, 313-3, 313-4, 313-5, also be provided by the temperature model, e.g. based on one or more of the temperatures T303, T305, T306, T317, T318 and/or based on additional parameters such as an ambient temperature, a runtime of the engine etc.

Figure 2:
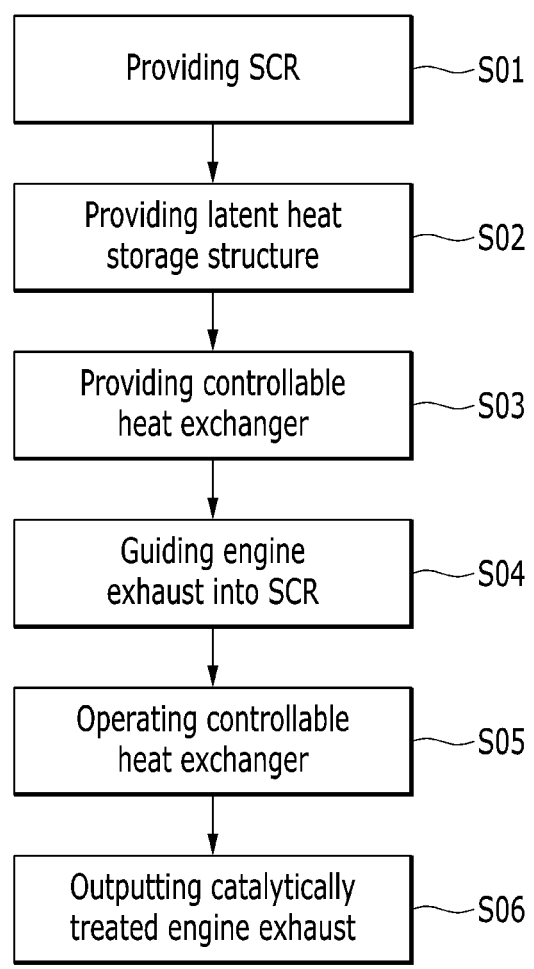
FIG. 2 is a schematic flow diagram illustrating steps of treating an engine exhaust in accordance with an exemplary embodiment of the present invention.

The temperature model may be generated using methods and techniques such as DOE ("design of experiments") or artificial neural networks. The temperature model may be generated as a look-up table. For example, measuring one of a temperature regarding the engine exhaust, i.e. T303 or T305, and one of a temperature regarding the heat transfer fluid 308, i.e. T317 or T318 or T306, and acquiring an ambient temperature may allow for the determination of one or more temperatures that are not being measured by temperature sensors 313-i. The ambient temperature may be detected e.g. by a sensor of a vehicle in which the engine and the exhaust treatment system 300 for the exhaust of the engine are installed. For example, the ambient temperature may be received via a controller area network (CAN) of the vehicle FIG. 2 shows a schematic flow diagram illustrating steps of treating an engine exhaust. In particular, the method includes providing a selective catalytic reduction catalytic converter 301 (S01), providing a latent heat storage structure 306 (S02), providing a controllable heat exchanger 307 (S03), guiding an engine exhaust 303 into the catalytic converter 301 (S04), operating the controllable heat exchanger 307 for selectively exchanging heat to and from the catalytic converter 301 and the latent heat storage structure 306 (S05), and outputting a catalytically treated engine exhaust 305 from the catalytic converter 301 (S06). The order of steps S01 to S03 may be swapped. In particular, a controller may be configured to execute the steps of guiding an engine exhaust 303 into a catalytic converter 301, operating the controllable heat exchanger 307, and outputting the catalytically treated engine exhaust 305.

Figure 3:
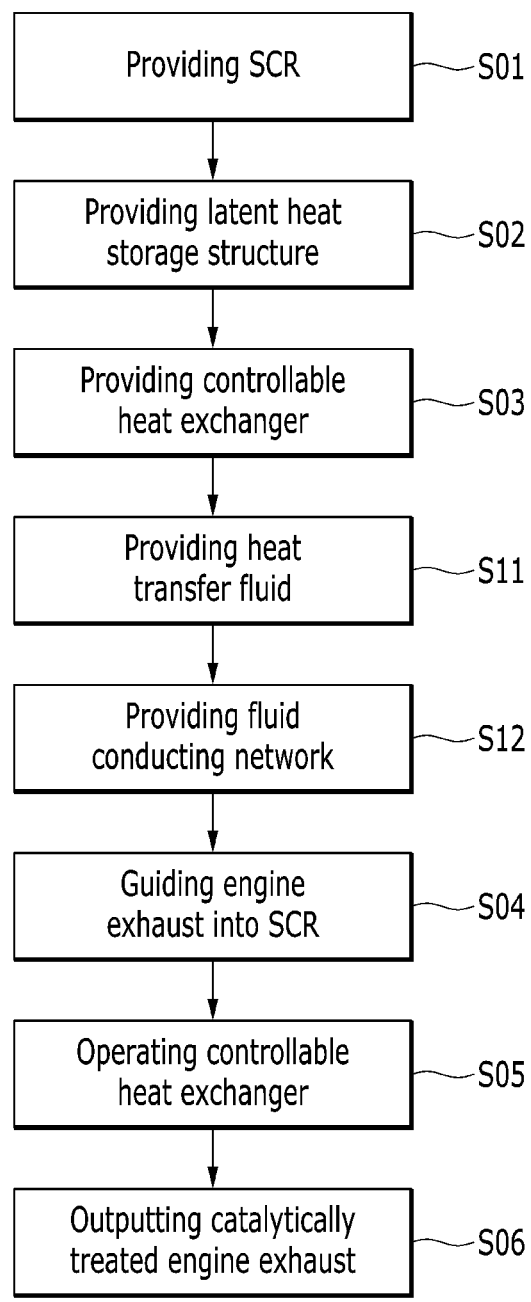
FIG. 3 is a schematic flow diagram illustrating steps of treating an engine exhaust using a heat transfer fluid and a fluid conducting network in accordance with an exemplary embodiment of the present invention.

FIG. 3 shows a schematic flow diagram illustrating steps of treating an engine exhaust using a heat transfer fluid and a fluid conducting network. In addition, to the steps shown in FIG. 2, the step S11 of providing a heat transfer fluid 308, and the step S12 of providing a fluid conducting network 309 for conducting the heat transfer fluid 308 to and from the controllable heat exchanger 307 and the latent heat storage structure 306 are introduced. The order of steps S01, S02, S03, S11, and S12 may be swapped.

Figure 4:
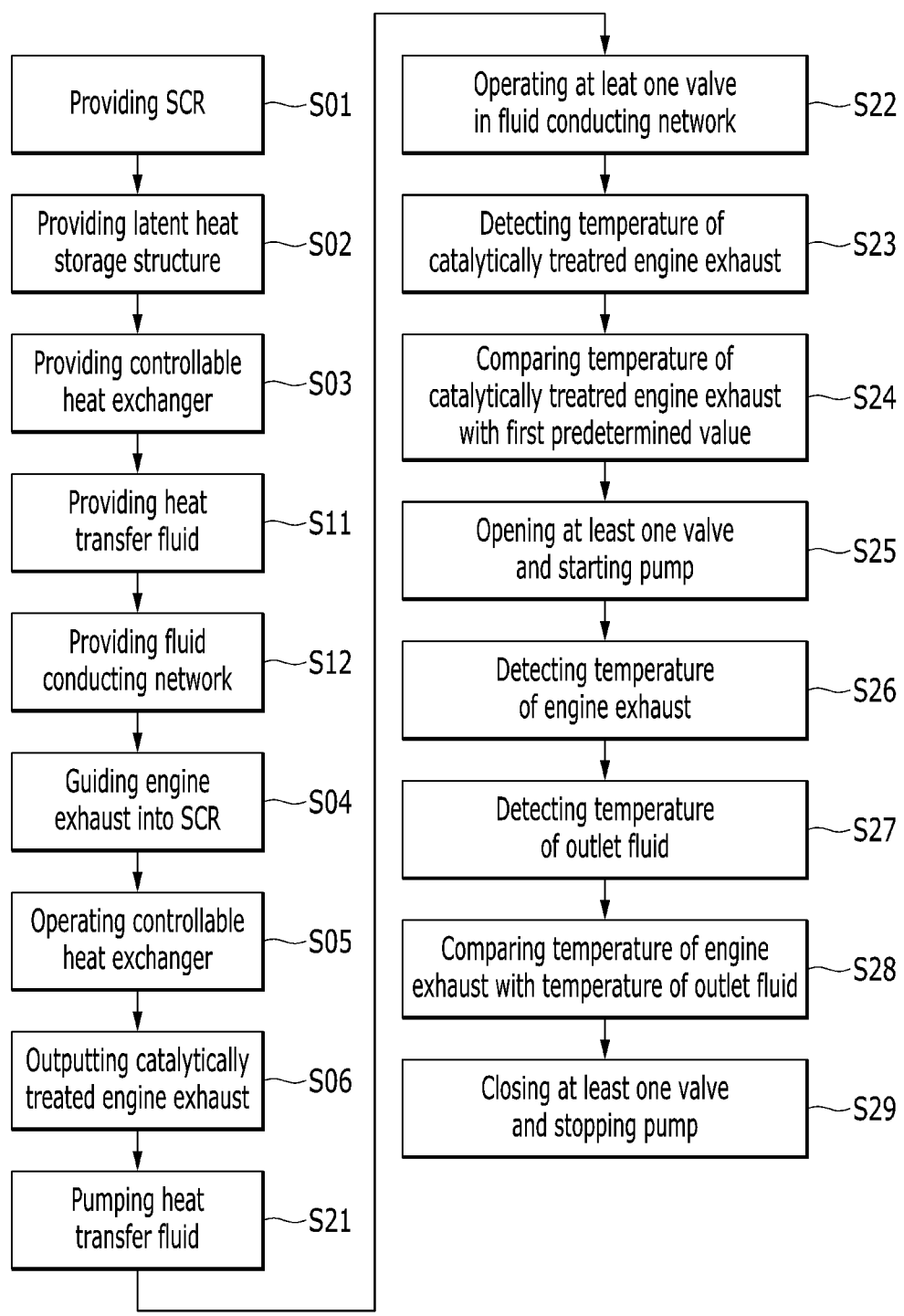
FIG. 4 is a schematic flow diagram illustrating steps of heating up a selective catalytic reduction catalytic converter in accordance with an exemplary embodiment of the present invention.

FIG. 4 shows a schematic flow diagram illustrating steps of heating a selective catalytic reduction catalytic converter (e.g., increasing the temperature of a selective catalytic reduction catalytic converter). In addition, to the steps shown in FIG. 3, following steps are introduced: circulating the heat transfer fluid 308 within the fluid conducting network 309 using a pump 310 and pumping the heat transfer fluid 308 to circulate the fluid (S21), operating at least one valve 311-i in the fluid conducting network 309 between the controllable heat exchanger 307 and the latent heat storage structure 306 (S22), detecting a temperature T305 of the catalytically treated engine exhaust 305 (S23), comparing the temperature T305 of the catalytically treated engine exhaust 305 with a first predetermined value T1 (S24), opening at least one valve 311-i and starting the pump 310 when the temperature T305 of the catalytically treated engine exhaust 305 is less than the first predetermined value T1 (S25), detecting a temperature T303 of the engine exhaust 303 (S26); detecting a temperature T318 of an outlet fluid 318 (S27); comparing the temperature T303 of the engine exhaust 303 being guided to the catalytic converter 301 with the temperature T318 of the outlet fluid 318 (S28), and closing at least one valve 311-i and stopping the pump 310 when the temperature T303 of the suctioned engine exhaust 303 exceeds the temperature T318 of outlet fluid 318 (S29).

The temperatures T305, T303, T318 may be detected by corresponding temperature sensors 313-1, 313-2, 313-3. In particular, the corresponding step of detecting any one of the temperatures T305, T303, T318, may include, a first sub-step of providing a corresponding temperature sensor 313-i, and a second sub-step of measuring said temperature Ti using said corresponding temperature sensor 313-i. Alternatively, any or all of the above temperatures T305, T303, T318 may be detected using the temperature model as described above. The temperature model stored in the controller 312 may be used to determine one or more of the temperatures thus omitting some of the temperature sensors 313-1, 313-2, and 313-3. For example, the temperature T305 of the catalytically treated engine exhaust 305 may be determined from the temperature T303 measured by the temperature sensor 313-2.

Figure 5:
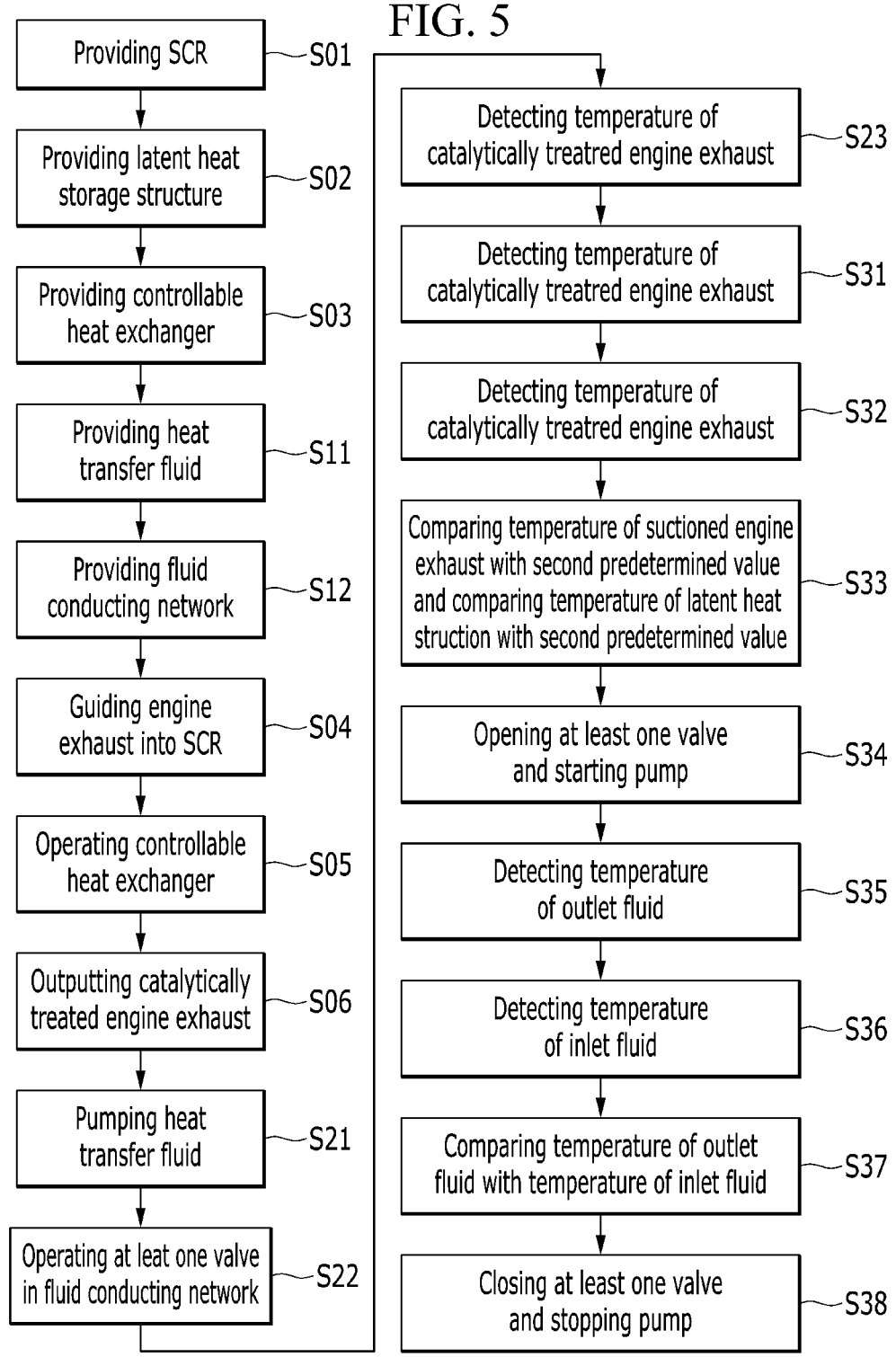
FIG. 5 is a schematic flow diagram illustrating steps of thermal charging (loading) of a latent heat storage structure in accordance with an exemplary embodiment of the present invention.

FIG. 5 shows a schematic flow diagram illustrating steps of thermal charging (loading) of a latent heat storage structure 306. In addition to the steps shown in FIG. 3, and steps S21 to S22 in FIG. 4, the following steps are introduced: detecting a temperature T303 of the suctioned engine exhaust 303 (S31), detecting a temperature T306 of the latent heat structure 306 (S32), comparing the temperature T303 of the suctioned engine exhaust 303 with a second predetermined value T2 and comparing the temperature T306 of the latent heat structure 306 with the second predetermined value T2 (S33), opening at least one valve 311-$i$ and starting the pump 310 when the temperature T303 of the engine exhaust 303 exceeds the temperature T2 of the second predetermined value and the second predetermined value T2 exceeds the temperature T306 of the latent heat structure 306 (S34).

Additionally, the following steps may be introduced: detecting a temperature T318 of the outlet fluid 318 (using the temperature sensor 313-3 and measuring the temperature T318, or alternatively, using the temperature model described above) (S35); detecting a temperature T317 of the inlet fluid 317 (using the temperature sensor 313-5 and measuring the temperature T317, or alternatively, using the temperature model described above) (S36); comparing the temperature T318 of the outlet fluid 318 with the temperature T317 of the inlet fluid 317 (S37), and closing at least one valve 308 and stopping the pump 310 when the temperature T318 of the outlet fluid 318 exceeds the temperature T317 of the inlet fluid 317 (S38).

The temperatures T303, T318, T306, T317, may be detected by corresponding temperature sensors 313-2, 313-3, 313-4, 313-5, and/or the temperature model as described above. The temperature model, which may be stored in the controller 312, to determine one or more of the temperatures T303, T318, T306, T317 thus eliminating some of the temperature sensors 313-2, 313-3, 313-4, 313-5. Accordingly, associated costs may be reduced. For example, the temperature T318 of the outlet fluid 318 may be determined from the temperature T317 measured by the temperature sensor 313-5.

Although the present invention has been described above with reference to exemplary embodiments, it is not limited thereto, but is modifiable in a variety of ways.

LIST OF REFERENCE SIGNS 300 exhaust treatment system
301 selective catalytic reduction (SCR) catalytic converter
302 inlet of the SCR catalytic converter
303 engine exhaust
304 outlet of the SCR catalytic converter
305 treated engine exhaust
306 latent heat storage structure
307 controllable heat exchanger
308 heat transfer fluid
309 fluid conducting network
310 pump
311-1 valve
311-2 valve
312 controller
313-1 temperature sensor
313-2 temperature sensor
313-3 temperature sensor
313-4 temperature sensor
313-5 temperature sensor
314 SCR doser
315 inlet of the latent heat storage structure
316 outlet of the latent heat storage structure
317 inlet fluid
318 outlet fluid

What is claimed is:

1. An exhaust treatment system, comprising:
 a selective catalytic reduction catalytic converter having an inlet for connecting to an internal combustion engine to intake an engine exhaust and an outlet to output a catalytically treated engine exhaust;
 a latent heat storage structure;
 a controllable heat exchanger for selectively exchanging heat to and from the catalytic converter and the latent heat storage structure, wherein the controllable heat exchanger includes:
  a heat transfer fluid;
  a fluid conducting network for conducting the heat transfer fluid to and from the controllable heat exchanger and the latent heat storage structure; and
  a heating jacket or a heating element that surrounds the catalytic converter at least partially or is disposed at least partially within the catalytic converter;
 a pump configured to circulate the heat transfer fluid within the fluid conducting network;
 at least one valve in the fluid conducting network between the controllable heat exchanger and the latent heat storage structure;
 at least one temperature sensor configured to measure a temperature of the engine exhaust, the catalytically treated engine exhaust, the latent heat storage structure, and the heat transfer fluid;
 a controller configured to operate the pump and the valve based on a measurement of the at least one temperature sensor to operate the controllable heat exchanger;
 a first temperature sensor configured to measure a temperature of the catalytically treated engine exhaust,
 wherein the controller is configured to:
  compare the temperature of the catalytically treated engine exhaust with a first predetermined value; and
  when the temperature of the catalytically treated engine exhaust is less than the first predetermined value, open at least one valves and start the pump;
 a second temperature sensor configured to measure a temperature of suctioned engine exhaust; and
 a third temperature sensor configured to measure a temperature of an outlet fluid,
 wherein the controller is further configured to:
  compare the temperature of the suctioned engine exhaust with the temperature of the outlet fluid; and
  when the temperature of the suctioned engine exhaust exceeds the temperature of the outlet fluid, close at least one valve and stop the pump.

2. The system of claim 1, further comprising:
 a selective catalytic reduction doser configured to add an additive to the engine exhaust between the inlet and the catalytic converter.

3. The system according to claim 1, further comprising a fourth temperature sensor configured to measure a temperature of the latent heat structure,
 wherein the controller is configured to:
  compare the temperature of the suctioned engine exhaust with a second predetermined value;
  compare the temperature of the latent heat structure with the second predetermined value; and
  when the temperature of the engine exhaust exceeds the temperature of the second predetermined value and the second predetermined value exceeds the temperature of the latent heat structure, open at least one valve and start the pump.

4. The system according to claim 3, further comprising a fifth temperature sensor configured to measure a temperature of an inlet fluid,
 wherein the controller is configured to:
  compare the temperature of the outlet fluid with the temperature of the inlet fluid;
  when the temperature of the outlet fluid exceeds the temperature of the inlet fluid, close at least one valve and stop the pump.

5. The system according to claim 4, wherein the latent heat storage structure includes a phase change material configured to store or release thermal energy when the phase change material is transitioning from one phase to another.

6. The system according to claim 4, wherein a section of the fluid conducting network passes from an inlet of the latent heat storage structure to an outlet of the latent heat storage structure through the latent heat storage structure.

7. A method of treating an engine exhaust, comprising:
guiding, by a controller, an engine exhaust into a catalytic converter;
operating, by the controller, a controllable heat exchanger for selectively exchanging heat to and from the catalytic converter and a latent heat storage structure;
outputting, by the controller, a catalytically treated engine exhaust from the catalytic converter;
operating, by the controller, a fluid conducting network for conducting a heat transfer fluid to and from the controllable heat exchanger and the latent heat storage structure;
operating, by the controller, a pump to circulate the heat transfer fluid within the fluid conducting network;
operating, by the controller, at least one valve in the fluid conducting network between the controllable heat exchanger and the latent heat storage structure;
detecting, by the controller, a temperature of the catalytically treated engine exhaust;
comparing, by the controller, the temperature of the catalytically treated engine exhaust with a first predetermined value;
opening, by the controller, at least one valve and starting the pump when the temperature of the catalytically treated engine exhaust is less than the first predetermined value;
measuring, by the controller, a temperature of the engine exhaust;
measuring, by the controller, a temperature of an outlet fluid;
comparing, by the controller, the temperature of the engine exhaust being guided to the catalytic converter with the temperature of the outlet fluid; and
closing, by the controller, at least one valve and stopping the pump when the temperature of suctioned engine exhaust exceeds the temperature of outlet fluid.

8. The method of claim 7, wherein a plurality of temperatures sensors are operated by the controller to detecting the temperatures.

9. The method of claim 7, further comprising:
operating, by the controller, a pump to circulate the heat transfer fluid within the fluid conducting network;
operating, by the controller, at least one valve in the fluid conducting network between the controllable heat exchanger and the latent heat storage structure;
detecting, by the controller, a temperature of the suctioned engine exhaust;
detecting, by the controller, a temperature of the latent heat structure;
comparing, by the controller, the temperature of the suctioned engine exhaust with a second predetermined value and comparing the temperature of the latent heat structure with the second predetermined value;
opening, by the controller, at least one valve and starting the pump when the temperature of the engine exhaust exceeds the temperature of the second predetermined value and the second predetermined value exceeds the temperature of the latent heat structure;
detecting, by the controller, a temperature of the outlet fluid;
detecting, by the controller, a temperature of the inlet fluid;
comparing, by the controller, the temperature of the outlet fluid with the temperature of the inlet fluid; and
closing, by the controller, at least one valve and stopping the pump when the temperature of the outlet fluid exceeds the temperature of the inlet fluid.

10. The method of claim 9, wherein a plurality of temperatures sensors are operated by the controller to detecting the temperatures.

* * * * *